United States Patent
Liu et al.

(10) Patent No.: US 10,409,425 B2
(45) Date of Patent: Sep. 10, 2019

(54) IN-CELL TOUCH PANEL WITH SHIELDING ELECTRODE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Hailin Xue, Beijing (CN); Haisheng Wang, Beijing (CN); Weijie Zhao, Beijing (CN); Shengji Yang, Beijing (CN); Xiaoliang Ding, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 520 days.

(21) Appl. No.: 14/650,708

(22) PCT Filed: Sep. 23, 2014

(86) PCT No.: PCT/CN2014/087155
§ 371 (c)(1),
(2) Date: Jun. 9, 2015

(87) PCT Pub. No.: WO2015/180321
PCT Pub. Date: Dec. 3, 2015

(65) Prior Publication Data
US 2016/0266677 A1    Sep. 15, 2016

(30) Foreign Application Priority Data
May 30, 2014   (CN) .......................... 2014 1 0241051

(51) Int. Cl.
*G06F 3/044*   (2006.01)
*G06F 3/041*   (2006.01)

(52) U.S. Cl.
CPC ............ *G06F 3/044* (2013.01); *G06F 3/0412* (2013.01); *G06F 2203/04107* (2013.01)

(58) Field of Classification Search
CPC ....................................................... G06F 3/044
See application file for complete search history.

(56) References Cited

U.S. PATENT DOCUMENTS

2009/0147163 A1   6/2009   Kim et al.
2010/0001973 A1*  1/2010   Hotelling ............ G02F 1/13338
                                                                  345/174

(Continued)

FOREIGN PATENT DOCUMENTS

CN    101882040 A    11/2010
CN    103135830 A    6/2013

(Continued)

OTHER PUBLICATIONS

International Search Report Appln. No. PCT/CN2014/087155; dated Sep. 3, 2015.

(Continued)

*Primary Examiner* — William Boddie
*Assistant Examiner* — Andrew B Schnirel
(74) *Attorney, Agent, or Firm* — Ladas & Parry LLP (57) ABSTRACT

An in-cell touch panel and a display device are provided, and the in-cell touch panel includes: an upper substrate and a lower substrate arranged oppositely to each other; a plurality of self-capacitance electrodes arranged in a same layer and insulated from each other at a side, facing the lower substrate, of the upper substrate or a side, facing the upper substrate, of the lower substrate; a shielding electrode provided at a side, facing the lower substrate, of each of the (Continued)

self-capacitance electrodes, which is insulated from the shielding electrode; and an insulating layer arranged between each of the self-capacitance electrodes and the shielding electrode. Such an in-cell touch panel may isolate the touch detection signals applied to the self-capacitance electrodes from the display signals, so as to avoid mutual interference therebetween.

20 Claims, 8 Drawing Sheets

(56) References Cited

U.S. PATENT DOCUMENTS

| | | | |
|---|---|---|---|
| 2010/0149116 A1* | 6/2010 | Yang | G06F 3/0416 345/173 |
| 2011/0221700 A1 | 9/2011 | Mo et al. | |
| 2012/0075237 A1 | 3/2012 | Ikeda et al. | |
| 2012/0274603 A1* | 11/2012 | Kim | G06F 3/0412 345/174 |
| 2013/0113693 A1* | 5/2013 | Araki | G02F 1/134363 345/87 |
| 2013/0147730 A1 | 6/2013 | Chien et al. | |
| 2013/0300962 A1* | 11/2013 | Kitani | G02F 1/13306 349/37 |
| 2013/0307787 A1 | 11/2013 | Robinson et al. | |
| 2014/0055689 A1 | 2/2014 | Lu et al. | |
| 2014/0184942 A1* | 7/2014 | Bang | G02F 1/13338 349/12 |
| 2014/0353691 A1* | 12/2014 | Lee | H01L 27/323 257/88 |
| 2015/0035790 A1 | 2/2015 | Mo et al. | |
| 2015/0035791 A1 | 2/2015 | Mo et al. | |
| 2016/0018935 A1 | 1/2016 | Wei et al. | |

FOREIGN PATENT DOCUMENTS

| | | |
|---|---|---|
| CN | 103399678 A | 11/2013 |
| CN | 103425347 A | 12/2013 |
| CN | 103713792 A | 4/2014 |
| CN | 103793120 A | 5/2014 |
| CN | 104020913 A | 9/2014 |
| EP | 3101516 A1 | 12/2016 |

OTHER PUBLICATIONS

Written Opinion of the International Searching Authority Appln. No. PCT/CN2014/087155; dated Mar. 3, 2015.
Second Chinese Office Action dated Aug. 24, 2016; Appln. No. 201410241051.3.
First Chinese Office Action dated Jun. 1, 2016; Appln. No. 201410241051.3.
The Extended European Search Report dated Dec. 7, 2017; Appln. No. 14866805.6.

* cited by examiner

IN-CELL TOUCH PANEL WITH SHIELDING ELECTRODE AND DISPLAY DEVICE

TECHNICAL FIELD

At least one embodiment of the present disclosure relates to an in-cell touch panel and a display device.

BACKGROUND

With the rapid growth of display techniques, the touch screen panel has gradually run into each aspect of human's life. Presently, according to structure, the touch screen panel may be clarified into add-on mode touch panel, on-cell touch panel, and in-cell touch panel. The add-on mode touch panel is a liquid crystal display panel with touch function formed by separately producing and then attaching together a touch screen panel and a liquid crystal display (LCD), and the add-on mode touch panel has disadvantages such as higher manufacture cost, lower light transmission rate, thicker module and the like. While in an in-cell touch panel, the touch electrode of a touch screen panel is embedded within a liquid crystal display, in such a way that it is possible to reduce the overall thickness of the module, and also depress greatly the manufacture cost, and thus the in-cell touch panel becomes attractive to main panel manufacturers.

Presently, the in-cell touch panel achieves the detection of a position that a finger touches by means of mutual capacitance or self-capacitance principle. With the self-capacitance principle, a plurality of self-capacitance electrodes arranged in a same layer and insulated from each other may be provided in a touch screen panel; when the screen is not touched by human body, the capacitance that each of the self-capacitance electrodes is subjected to is a fixed value; and when the human body touches the screen, the capacitance that a corresponding self-capacitance electrode is subjected to is the sum of the fixed value and body capacitance, and a touch detection chip may determine a touch position by detecting variation of the capacitance value of each of the self-capacitance electrodes during a touch period. The body capacitance may entirely act on the self-capacitance, thus with respect to the manner in which the body capacitance can merely act on the projective capacitance in the mutual capacitance, the touch variation induced by the touching of human body on the screen is greater, compared with the touch screen panel produced based on the mutual capacitance principle, and thus the touch screen panel of self-capacitance can effectively enhance the signal to noise ratio of touch and thereby improve touch sensing accuracy, compared with the touch screen panel of mutual capacitance.

SUMMARY

At least one embodiment of the present disclosure provides an in-cell touch panel and a display device, so as to reduce the mutual interference between display signals and touch signals, and improve picture quality and touch accuracy.

An in-cell touch panel provided by at least one embodiment of the present disclosure comprises: an upper substrate and a lower substrate arranged oppositely to each other; a plurality of self-capacitance electrodes provided at a side, facing the lower substrate, of the upper substrate or a side, facing the upper substrate, of the lower substrate, and arranged in a same layer and insulated from each other; a shielding electrode which is provided at a side, facing the lower substrate, of each of the self-capacitance electrodes, and is insulated from each of the self-capacitance electrodes; and an insulating layer provided between each of the self-capacitance electrodes and the shielding electrode.

At least one embodiment of the present disclosure provides a display device comprising the above-mentioned in-cell touch panel provided by the embodiment of present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The thicknesses and shapes of all the film layers in the drawings do not reflect the actual ratio, but aim to illustratively describe the present disclosure.

The inventor of the present application noted that in an in-cell touch panel, in order to depress the mutual interference between display signals and touch signals, and to improve picture quality and touch accuracy, it is generally required to drive the touch period and display period in a time-sharing driving manner; due to the time period for one frame is usually a fixed value, the time-sharing driving manner can cause less time period for the touch time period and the display time period, respectively, and this can lead to problems that insufficient charging can occur during the display time period and influence the normal display, and during the touch time period, the time period for detecting the signals may be too short that the touch effect can be affected, and similar problems.

The in-cell touch panel (in-cell touch screen panel) described below provided by embodiments of present disclosure is applicable for a twisted nematic (TN) mode liquid crystal display, and also for an advanced dimension switch (ADS) mode liquid crystal display and an in-plane switch (IPS) mode liquid crystal display.

Figure 1:
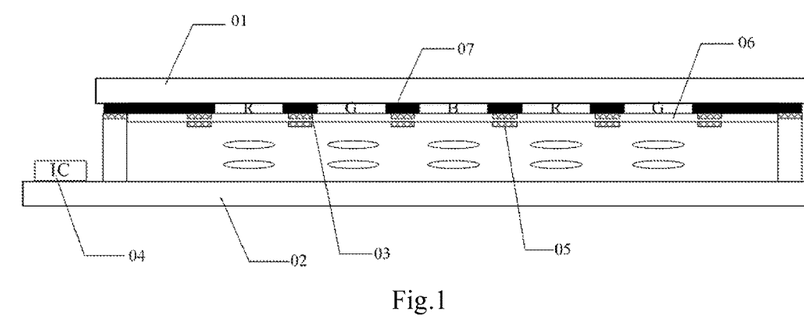
FIG. 1 is a structural schematic view of an in-cell touch panel provided by an embodiment of present disclosure.

As illustrated in FIG. 1, an in-cell touch panel provided by at least one embodiment of the present disclosure comprises: an upper substrate 01 and a lower substrate 02 arranged oppositely to each other; a plurality of self-capacitance electrodes 03 arranged in a same layer and insulated from each other at a side, facing the lower substrate 02, of the upper substrate 01 or a side, facing the upper substrate 01, of the lower substrate 02 (FIG. 1 illustrates a structure in which the self-capacitance electrodes are arranged at a side, facing the lower substrate 02, of the upper substrate 01); a shielding electrode 05 which is provided at a side, facing the lower substrate 02, of each of the self-capacitance electrodes 03, and is insulated from the self-capacitance electrode 03; and an insulating layer 06 provided between the self-capacitance electrode 03 and the shielding electrode 05. In one embodiment, the in-cell touch panel may further comprise a touch detection chip 04 configured for determining a touch position by detecting variation of capacitance value of each of the self-capacitance electrodes 03.

In the above-mentioned in-cell touch panel provided by the embodiment of present disclosure, by means of self-capacitance principle, a plurality of self-capacitance electrodes 03 are arranged in a same layer and insulated from each other in the touch panel, a shielding electrode 05 is provided at a side, facing the lower substrate 02, of each of the self-capacitance electrodes 03, and an insulating layer 06 is provided between each of the self-capacitance electrodes 03 and the shielding electrode 05; and the touch detection signals applied to the self-capacitance electrodes 03 can be separated from the signals for display by using the shielding electrode 05 which is insulated from each self-capacitance electrode 03, so as to avoid mutual interference between the touch detection signals and the signals for display, achieve synchronous execution of the touch detection drive and display drive, and ensure a better display and touch effect.

The above-mentioned in-cell touch panel provided by various embodiments of the present disclosure may further comprise: as illustrated in FIG. 1, a black matrix layer 07 arranged at a side, facing the lower substrate 02, of the upper substrate 01, or at a side, facing the upper substrate 01, of the lower substrate 02; an orthographic projection, upon the lower substrate 02, of a pattern of each self-capacitance electrode 03 and an orthographic projection, upon the lower substrate 02, of a pattern of the shielding electrode 05 may be arranged within an area where a pattern of the black matrix layer 07 is located.

Because the patterns of each self-capacitance electrode 03 and the shielding electrode 05 are arranged within the area where the pattern of the black matrix layer 07 is located, it is possible to prevent the self-capacitance electrode 03 and the shielding electrode 05 from influencing the transmittance of the touch panel. Based on this, metals may be available for manufacturing the shielding electrode 05 and the self-capacitance electrode 03; and transparent conductive materials may also be used for making the shielding electrode 05 and the self-capacitance electrode 03, for example, the transparent conductive materials may be indium tin oxide (ITO) or indium zinc oxide (IZO) material, carbon nanotube, graphene and the like. In practice, metals are usually used for making the shielding electrode 05 and the self-capacitance electrode 03, because the resistance of the metal is smaller than that of the ITO, so as to facilitate decreasing the resistances of the shielding electrode 05 and the self-capacitance electrode 03, and improve the touch sensitivity and the shielding effect of the shielding electrode 05.

Figure 2:
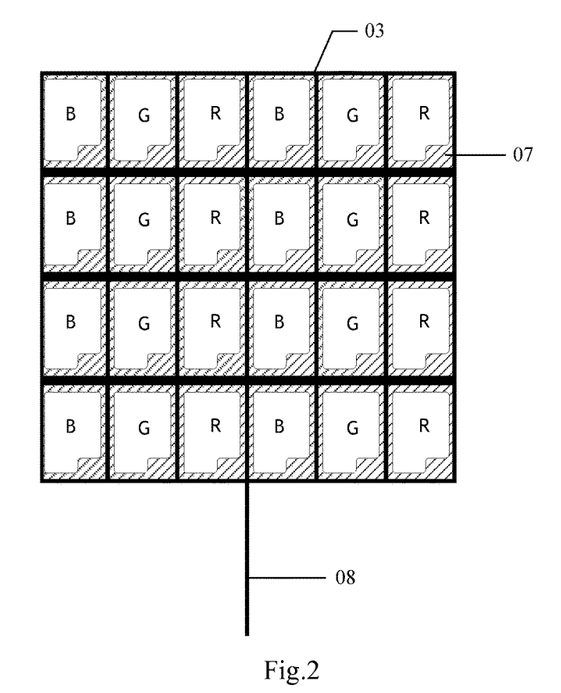
FIG. 2 is a structural schematic view of one self-capacitance electrode in an in-cell touch panel provided by an embodiment of present disclosure.

Because the touch panel generally has a density of millimeter scale, in practice, it is possible to select the density of the self-capacitance electrode 03 and area that each self-capacitance electrode 03 occupies according to the required touch density, so as to ensure the required touch density. For example, each self-capacitance electrode 03 is usually designed to be a square electrode and sized to be about 5 mm*5 mm. The display screen usually has its density in micron order, and thus one self-capacitance electrode 03 can generally correspond to a plurality of pixel units in the display screen. In order to ensure that the pattern of each self-capacitance electrode 03 does not occupy the opening zone of the pixel unit, as illustrated in FIG. 2, a portion of the pattern of each self-capacitance electrode 03 at the position corresponding to the opening zone of the pixel unit may be removed, that is to say, the pattern of each self-capacitance electrode 03 may be designed in such a way that its orthographic projection upon the lower substrate 02 is a lattice structure within the area where the pattern of the black matrix layer 07 is set. Moreover, in order to ensure the display uniformity, the gap between sub-pixel units of each pixel unit may be provided with the pattern of the self-capacitance electrode 03, and in FIG. 2, each group of RGB sub-pixel units forms one pixel unit. The density indicated in the embodiment of present disclosure refers to the pitch of the self-capacitance electrode of the touch panel, or the pitch of the pixel unit of the display screen.

Based on this, due to the fact that the shielding electrode 05 acts to insulate the touch detection signals applied to the self-capacitance electrode 03 from the signals for display, accordingly, in one embodiment, the pattern of the shielding electrode 05 can cover the pattern of the self-capacitance electrode 03, that is to say, because the orthographic projection, upon the lower substrate 02, of the pattern of the self-capacitance electrode 03 may be a lattice structure within the area where the pattern of the black matrix layer 07 is arranged, accordingly, the orthographic projection, upon the lower substrate 02, of the pattern of the shielding electrode may likewise be a lattice structure within the area where the pattern of the black matrix layer 07 is arranged.

Figure 3:
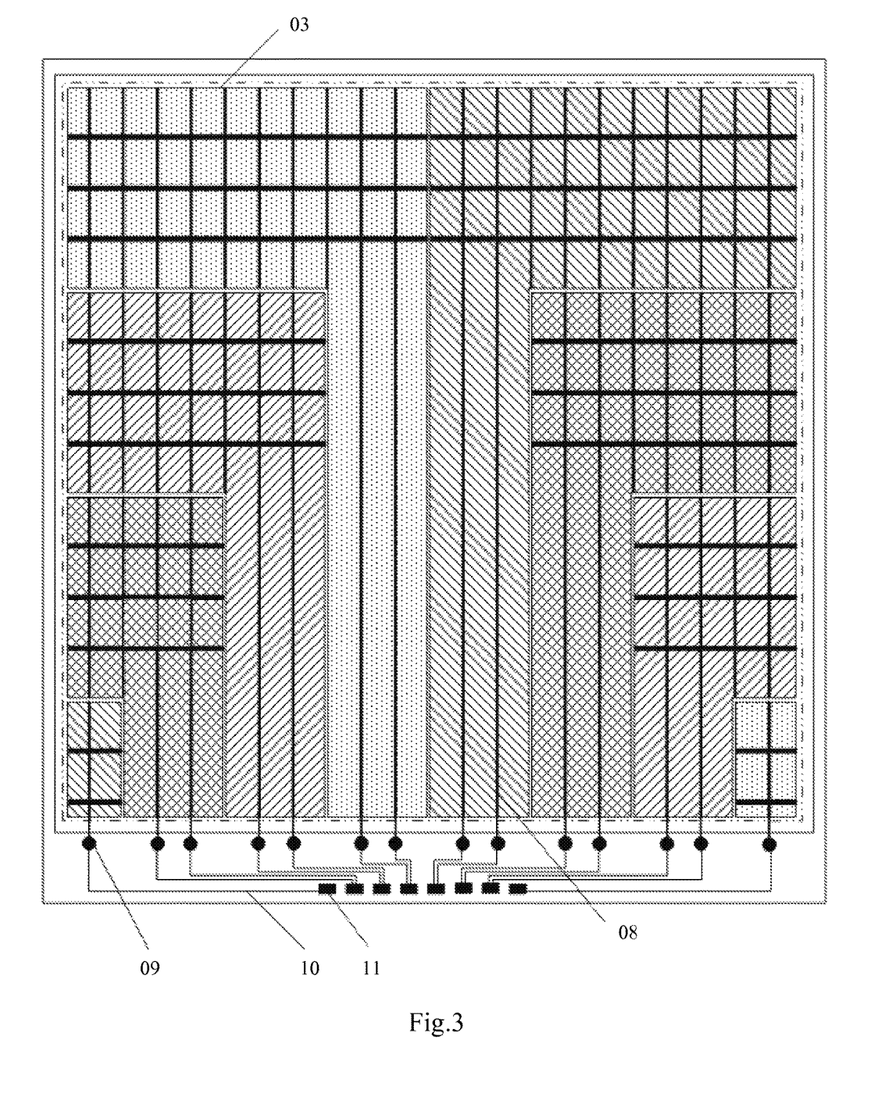
FIG. 3 is a schematic view illustrating that conductive wires and self-capacitance electrodes are arranged in a same layer, in an in-cell touch panel provided by an embodiment of present disclosure.

In one embodiment, in order to facilitate the touch detection chip to detect the variation of the capacitance value of each self-capacitance electrode, as illustrated in FIG. 3, the above-mentioned in-cell touch panel provided by an embodiment of present disclosure may further comprise conductive wires 08 corresponding to the self-capacitance electrodes 03 in a one-to-one manner, and conductive nodes 09 corresponding to the self-capacitance electrodes 03 in a one-to-one manner; the respective conductive nodes 09 are generally arranged in an area where a frame sealant of the in-cell touch panel is provided, and further, in order not to influence normal display function, the orthographic projection, upon the lower substrate 02, of each conductive wire 08 is also arranged within the area where the pattern of the black matrix layer 07 is located; each of the self-capacitance electrodes 03 is connected to a conductive node 09 through a conductive wire 08, then is electrically connected with a connection terminal 11 of a touch detection chip through a leading wire 10 in the area where the frame sealant is arranged. FIG. 3 illustrates a case where eight (8) self-capacitance electrodes 03 are arranged within one row, and the number of the conductive wire 08 and the number of the conductive node 09 respectively corresponding to each self-capacitance electrode 03 may be one, or may also be multiple, and limitations are not imposed thereto.

In practice, the conductive wires 08 and conductive nodes 09 are generally provided on the same substrate together with the self-capacitance electrodes 03, that is to say, may be provided on the upper substrate 01 simultaneously, or may also be provided on the lower substrate 02 simultaneously; and leading wires 10 and connection terminals 11 of the touch detection chip are generally provided on the lower substrate 02. When the conductive wires 08 and conductive nodes 09 are provided on the upper substrate 01 together with the self-capacitance electrodes 03, the conductive nodes 09 may be respectively electrically connected with the leading wires 10 in the area where the frame sealant of the lower substrate 02 is arranged, through the effect, of electrically connecting an upper portion and a lower portion, of the conducting particles (for example, gold balls) in the frame sealant, and then respectively led to the connection terminals 11 of a corresponding touch detection chip through the leading wires 10. When the conductive wires 08 and the conductive nodes 09 are provided on the lower substrate 02 together with the self-capacitance electrodes 03, the conductive nodes 09 may be directly electrically connected with the leading wires 10 in the area where the frame sealant of the lower substrate 02 is provided, respectively, and then respectively led to the connection terminals 11 of the corresponding touch detection chip through the leading wires 10.

In one embodiment, as illustrated in FIG. 3, the conductive wires 08 and the self-capacitance electrodes 03 may be provided in a same layer. In order to guarantee that the shielding electrode 05 can isolate the touch detection signals applied to the self-capacitance electrode from the signals for display, the orthographic projection, upon the lower substrate 02, of the pattern of the shielding electrode 05 covers the patterns of each conductive wire 08 and each self-capacitance electrode 03.

When the conductive wires 08 and the self-capacitance electrodes 03 are arranged in a same layer, one metal layer is employed to design the patterns of the self-capacitance electrodes 03 and conductive wires 08, so, in order to avoid the occurrence of short circuit between the self-capacitance electrodes 03, the conductive wires 08 respectively connected with the self-capacitance electrodes 03 are required to be not crossed with each other. Therefore, when the wiring manner illustrated in FIG. 3 is used to design the conductive wires, that is, when the employed wiring manner is such that the conductive wires 08 connected with all the self-capacitance electrodes 03 extend in one direction, and are respectively connected to corresponding conductive nodes 09 within the same side area, many touch blind areas can occur in the touch panel. FIG. 3 shows touch blind areas formed by eight self-capacitance electrodes 03 in a row, and in FIG. 3, only the patterns of the self-capacitance electrodes 03 and the patterns of the conductive wires 08 respectively connected with the self-capacitance electrodes 03 are illustrated, but the patterns of sub-pixel units are not provided; and moreover, for the convenience of watching, in FIG. 3, different filling patterns are used to illustrate the areas respectively occupied by the self-capacitance electrodes 03. In a touch blind area, all the conductive wires 08 respectively coupled with a plurality of self-capacitance electrodes pass through this touch blind area, so the signals within this touch blind area are relatively abnormal, it is thus called touch blind area, and that is, the touch performance within such an area can not be guaranteed.

To reduce the area of the touch blind area as much as possible, the conductive nodes 09 can be distributed at each of the four sides of the area where the frame sealant of the in-cell touch panel is arranged, that is, four sides of the area where the frame sealant is arranged are each provided with conductive nodes 09, in this way, the self-capacitance electrodes 03 are respectively connected with the corresponding conductive nodes 09 provided at the periphery of the display area through the conductive wires 08, and thus the area of the touch blind area on the whole can be decreased.

Figure 4:
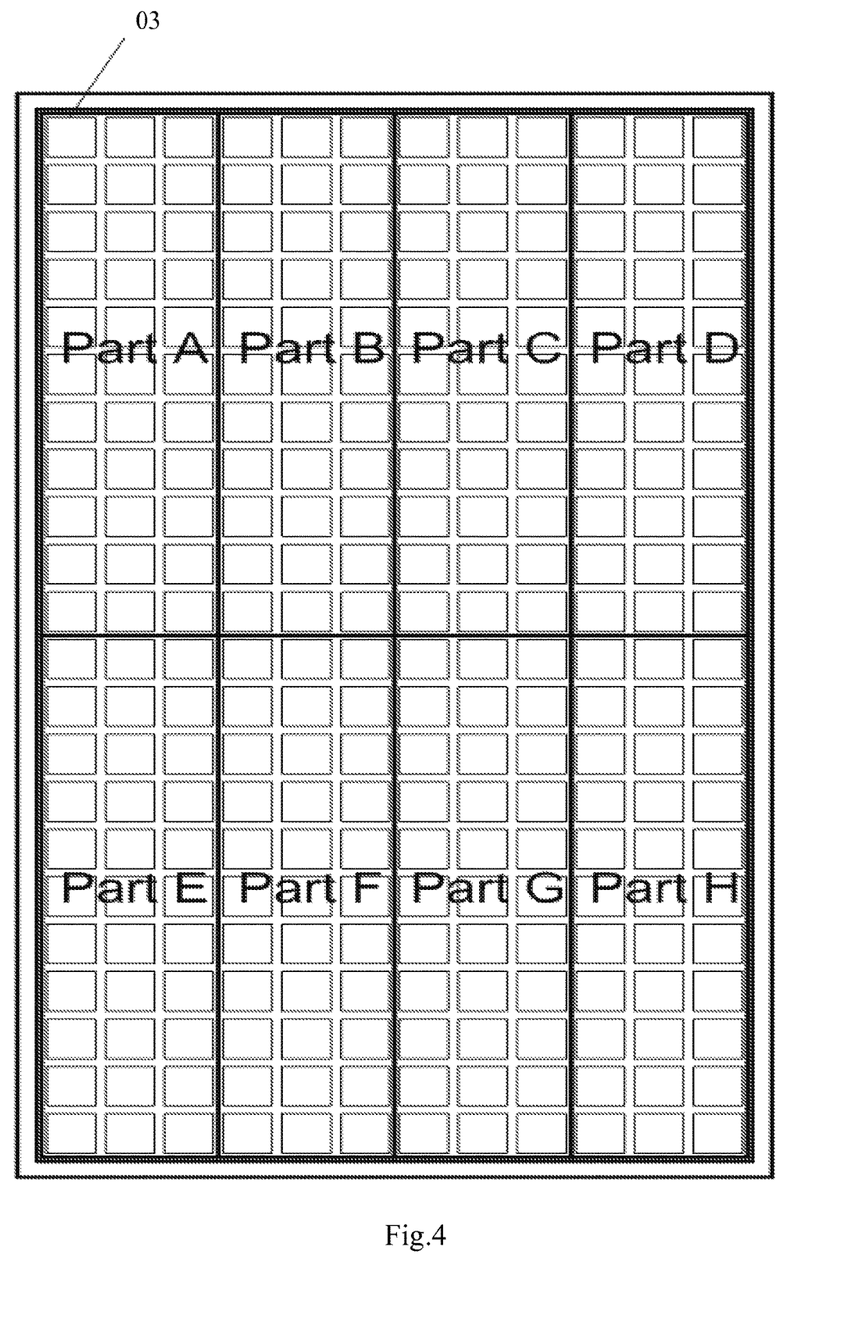
FIG. 4 is a schematic view illustrating subareas for self-capacitance electrodes in a display area of an in-cell touch panel provided by an embodiment of present disclosure.
Figure 5:
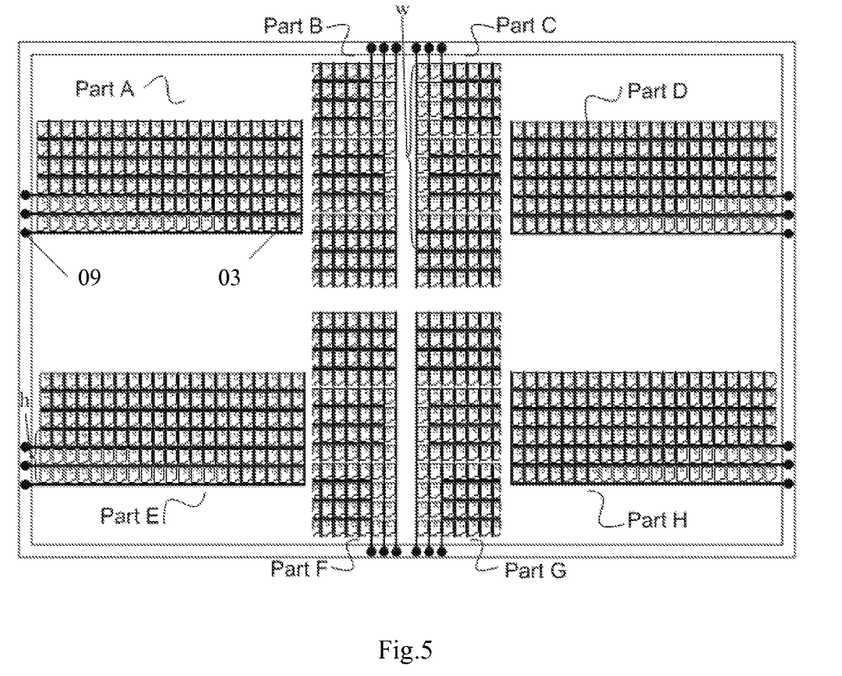
FIG. 5 is a schematic view illustrating connection between self-capacitance electrodes and conductive nodes, arranged in a same layer and in each area of an in-cell touch panel provided by an embodiment of present disclosure.

A description will be made to the above design of reducing touch blind area provided by the embodiments of present disclosure taking a 5-inch touch panel as an example. The number of the self-capacitance electrodes 03 required in the 5-inch touch panel is about 22*12=264. As illustrated in FIG. 4, in order to connect each of the self-capacitance electrodes 03 and the corresponding conductive nodes 09, and to reduce the area of the touch blind area as far as possible, all the self-capacitance electrodes 03 can be divided into 8 areas Part A~Part H, and for each area, it is required that the self-capacitance electrodes 03 in the area are individually connected to the connection terminals (FPC bonding pad) 11 of the touch detection chip below the display area (panel). As illustrated in FIG. 5, each area in FIG. 5 is provided with 3 self-capacitance electrodes 03; each of the self-capacitance electrodes in area Part A is led out from the top left of the display area, passes through the left frame of the display area and then is connected to a connection terminal of the touch detection chip; each of the self-capacitance electrodes in area Part B is led out from the upper portion of the display area, passes through the left frame of the panel and then is connected to a connection terminal of the touch detection chip; each of the self-capacitance electrodes in area Part C is led out from the upper side of the display area, passes through the right frame of the display area and then is connected to a connection terminal of the touch detection chip; each of the self-capacitance electrodes in area Part D is led out from the upper right of the display area, passes through the right frame of the display area and then is connected to a connection terminal of the touch detection chip; similarly, each of the self-capacitance electrodes in area Part E is led out from the lower left of the display area, passes through the left frame of the display area and then is connected to a connection terminal of the touch detection chip; each of the self-capacitance electrodes in area Part F led out from the lower side of the display area, and then is directly connected to a connection terminal of the touch detection chip; each of the self-capacitance electrodes in area Part D is led out from the lower side of the display area, and then is directly connected to a connection terminal of the touch detection chip; and each of the self-capacitance electrodes in area Part H is led out from the lower right of the display area, passes through the right frame of the display area and then is connected to a connection terminal of the touch detection chip.

For the convenience of viewing, FIG. 5 only illustrates the connection relationship between part of the self-capacitance electrodes 03 and the conductive nodes 09. It can be seen from FIG. 5 that, in each of the Part A, Part D, Part E and Part H located at either side of the display area, the dimension of the touch blind area is about the height of three sub-pixel units, which is indicated by h, and upon being estimated based on the magnitude of corresponding pixel unit in the 5-inch touch panel, the touch blind area is about 260 μm; and the dimension of the touch blind area in each of the Part B, Part C, Part F and Part G located in the middle of the display area is about the width of ten sub-pixel units, which is indicated by w in FIG. 5, and upon being estimated based on the magnitude of the corresponding pixel unit in the 5-inch touch panel, the touch blind area is about 290 μm.

The connection relationship between the above self-capacitance electrodes 03 and conductive nodes 09 is merely illustrative, and, in practical design, may be designed according to specific dimensions of the touch panel. In order to reduce the area of the touch blind area as much as possible, it is possible to distribute a conductive node 09 corresponding to each of the self-capacitance electrodes 03 at a side of the area where the frame sealant closest to the self-capacitance electrode 03 is arranged, and thus in this way, it is possible to shorten the length of the conductive wire 08 connecting the self-capacitance electrode 03 and the conductive node 09 as much as possible, so as to reduce the area of the touch blind area as far as possible.

Figure 6:
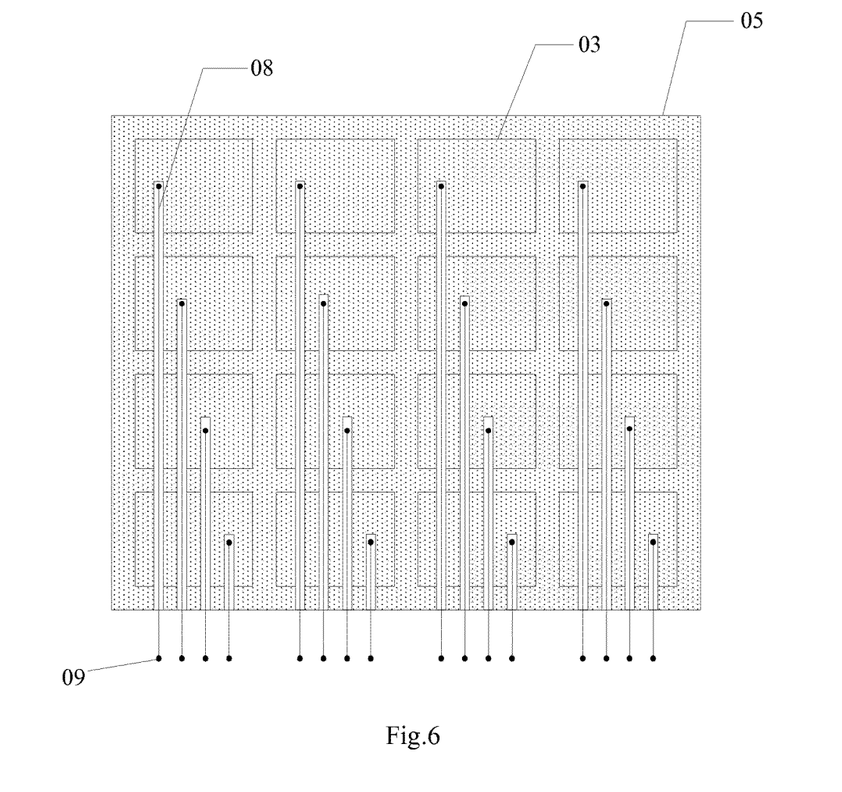
FIG. 6 is a structural schematic view illustrating that conductive wires are provided in a same layer as a shielding electrode, in an in-cell touch panel provided by an embodiment of present disclosure.

In one embodiment, to eliminate the touch blind area occurring in the touch panel, the self-capacitance electrodes 03 and the conductive wires 08 may be provided in different layers. For example, as illustrated in FIG. 6, the conductive wires 08 and the shielding electrode 05 may be arranged in a same layer, and each self-capacitance electrode 03 and a corresponding conductive wire 08 are electrically connected with each other through a via hole in the insulating layer 06, and in this way, it is possible to prevent the occurring of touch blind area, and also not to add manufacturing process. For example, the wiring manner illustrated in FIG. 6 may be used upon designing the connection relationship of the conductive wires 08, that is, the conductive wires 08 respectively connected with all the self-capacitance electrodes 03 extend in one direction, and are respectively connected to the corresponding conductive nodes 09 within the same side area in the area where the frame sealant is arranged.

In one embodiment, in order to guarantee that the shielding electrode 05 can isolate the touch detection signals applied to the self-capacitance electrodes 03 from the signals for display, when the conductive wires 08 and the shielding electrode 05 are provided in a same layer arrangement, the orthographic projections, upon the lower substrate 02, of the patterns of the shielding electrode 05 and the conductive wires 08 may cover the pattern of each self-capacitance electrode 03. FIG. 6 illustrates a pattern of the conductive wires and the shielding electrode 05 which are provided in a same layer, and it can be seen from FIG. 6 that the shielding electrode 05 is insulated from the conductive wires.

In practice, in the above-mentioned in-cell touch panel provided by an embodiment of present disclosure, both the self-capacitance electrodes 03 and the shielding electrode 05 may be provided on the upper substrate 01, and an existing film layer of the upper substrate 01 is used as the insulating layer 06, and thus it is only required to add a manufacturing process for making the metal layers of the self-capacitance electrodes 03 and the shielding electrode 05 into the process of manufacturing the upper substrate 01. For example, as illustrated in FIG. 7, the black matrix layer 07 may be arranged at a side, facing the lower substrate 02, of the upper substrate 01, the black matrix layer 07 is generally provided with a color filter layer 12 thereon, a planarization layer 13 is generally provided on the color filter layer 12, and the planarization layer 13 is generally provided with a spacer layer 14.

Figure 7:
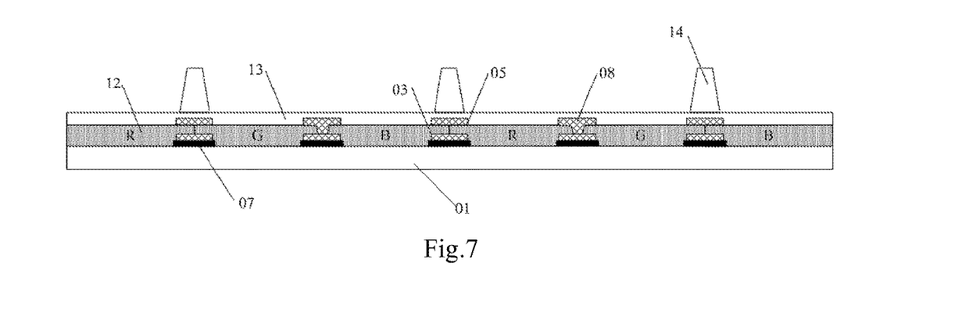
FIG. 7 is a structural schematic view illustrating that both self-capacitance electrodes and a shielding electrode are arranged on an upper substrate, in an in-cell touch panel provided by an embodiment of present disclosure.

The first possible embodiment is that: as illustrated in FIG. 7, the color filter layer 12 is used as the insulating layer 06 arranged between the self-capacitance electrodes 03 and the shielding electrode 05. For example, each of the self-capacitance electrodes 03 is arranged between the black matrix layer 07 and the color filter layer 12, and the conductive wires 08 and the shielding electrode 05 are arranged between the color filter layer 12 and the planarization layer 13.

The second possible embodiment is that: the planarization layer 13 is used as the insulating layer 06 arranged between the self-capacitance electrodes 03 and the shielding electrode 05. For example, each of the self-capacitance electrodes 03 is arranged between the color filter layer 12 and the planarization layer 13, and the conductive wires 08 and the shielding electrode 05 are arranged between the planarization layer 13 and the spacer layer 14.

The third possible embodiment is that: the spacer layer 14 is used as the insulating layer 06 arranged between the self-capacitance electrodes 03 and the shielding electrode 05. For example, each of the self-capacitance electrodes 03 is arranged between the planarization layer 13 and the spacer layer 14, and the conductive wires 08 and the shielding electrode 05 are arranged on the spacer layer 14.

In the above-mentioned three possible embodiments, if the conductive wires 08 and the shielding electrode 05 are arranged in a same metal layer, when the color filter layer 12 or the spacer layer 14 is used as the insulating layer 06, because both the two film layers are required to be subjected to a patterning process, it only required to change the mask plate pattern in the patterning process so as to add the patterns of the via holes respectively connecting the conductive wires 08 and the self-capacitance electrodes 03, without adding additional manufacturing processes; and when the planarization layer 13 is used as the insulating layer 06, because the planarization layer 13 does not need a patterning process originally, it is required to add a mask plate for the corresponding planarization layer 13, and this can add one manufacturing process. Therefore, the film layer positions of the self-capacitance electrodes 03 and the shielding electrode 05 may be arranged as required, and limitations are not imposed thereto.

Similarly, in practice, in the above-mentioned in-cell touch panel provided by an embodiment of present disclosure, both the self-capacitance electrodes 03 and the shielding electrode 05 may be provided on the lower substrate 02, and an existing film layer of the lower substrate 02 is used as the insulating layer 06, and thus it is only required to add the manufacturing processes for making the metal layers of the self-capacitance electrodes 03 and the shielding electrode 05 into the manufacturing process of the lower substrate 02. For example, the lower substrate 02 is generally provided with a common electrode layer, a passivation layer is generally provided on the common electrode layer, and the passivation layer is generally provided with a pixel electrode layer.

A possible embodiment may be the one in which the passivation layer is used as the insulating layer 06 between the self-capacitance electrodes 03 and the shielding electrode 05. For example, the self-capacitance electrodes 03 may be arranged on the passivation layer, and the conductive wires 08 and the shielding electrode 05 are arranged between the common electrode layer and the passivation layer. Moreover, the self-capacitance electrodes 03 are generally made of metal and can not be made simultaneously with the pixel electrode layer made of ITO, and the pattern of a pixel electrode is only provided at an opening zone of each pixel unit, has no pattern at the pattern area of the black matrix layer, and thus does not overlap with the patterns of the self-capacitance electrodes. Therefore the patterns of the self-capacitance electrodes 03 may be made before or after the manufacture of the pixel electrode layer.

In the above-mentioned touch panel provided by one embodiment of the present disclosure, the shielding electrode is provided below the self-capacitance electrodes so as to isolate the mutual interference between the touch detection signals and the signals for display, so the touch and display of the touch panel may be done in a simultaneous drive manner or a time-sharing drive manner, that is to say, the touch detection chip may operate during both the display time period and the touch time period in each frame, or alternatively, may operate only during the touch time period in each frame. Moreover, in one embodiment, the display drive chip and the touch detection chip may be further integrated into one chip, so as to further reduce the production cost.

Figure 8A:
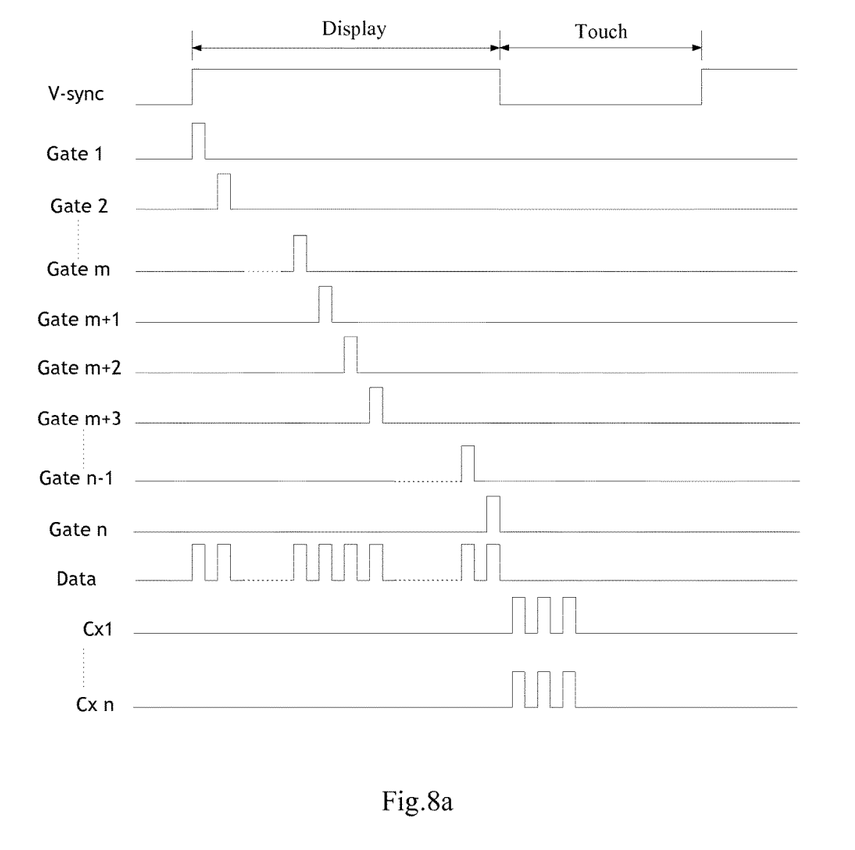
FIGS. 8a and 8b are schematic diagrams respectively illustrating a time-sharing drive time sequence for touch and display of an in-cell touch panel provided by an embodiment of present disclosure.
Figure 8B:
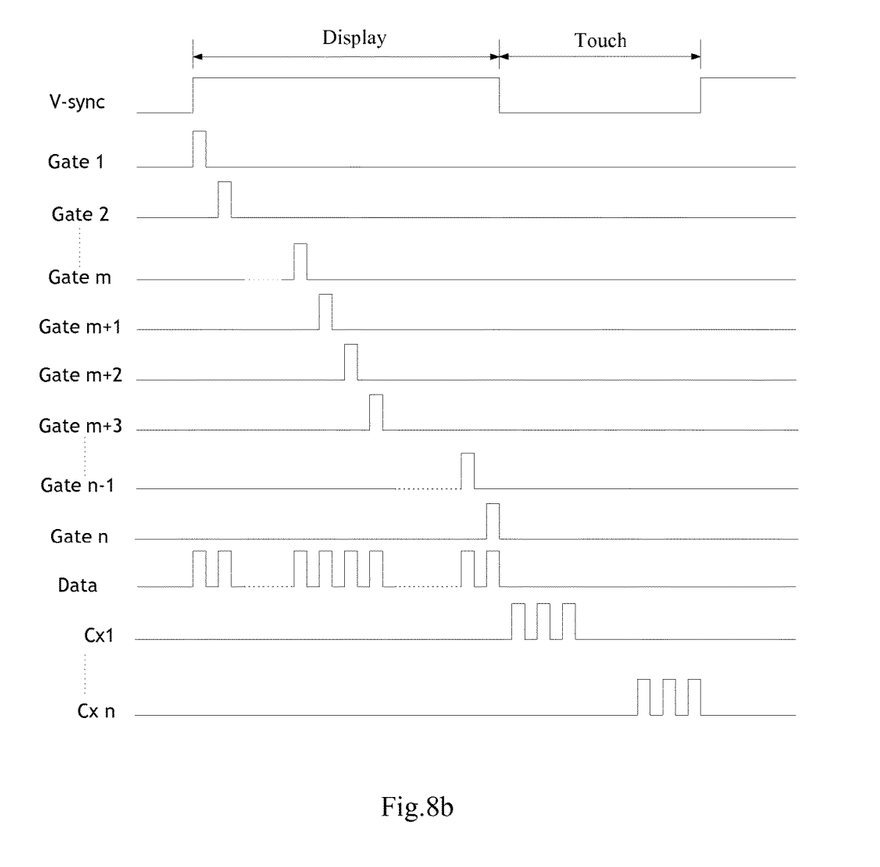

For example, when the time-sharing drive manner is employed, referring to the drive time sequence diagrams as illustrated in FIGS. 8a and 8b, the time period for displaying each frame (V-sync) in the touch panel is separated into a display time period and a touch time period. For example, in the drive time sequence diagrams illustrated in FIGS. 8a and 8b, the time period for displaying one frame in the touch panel is 16.7 ms, in which 5 ms is chosen as the touch time period, and the rest 11.7 ms is used as the display time period. Of course, the duration of the touch time period and the display time period may also be appropriately regulated according to the processing capacity of the IC (Integrated Circuit) chip, and limitations are not imposed thereto. During the display time period, each gate signal line Gate 1, Gate 2, . . . , Gate n in the touch panel is applied with a gate scanning signal sequentially, and a gray scale signal is applied to the data signal line, so as to achieve the liquid crystal display function. During the touch time period, as illustrated in FIG. 8a, the touch detection chip connected with the self-capacitance electrodes Cx 1, . . . , Cx n may apply a driving signal simultaneously to each of the self-capacitance electrodes Cx 1, . . . , Cx n, and simultaneously receive feedback signals from the self-capacitance electrodes Cx 1, . . . , Cx n; and also, as illustrated in FIG. 8b, the touch detection chip connected with the self-capacitance electrodes Cx 1, . . . , Cx n applies a driving signal successively to each of the self-capacitance electrodes Cx 1, . . . , Cx n, and respectively receives a feedback signal from each of the self-capacitance electrodes Cx 1, . . . , Cx n, and limitations are not limited thereto. Then, the feedback signals are analyzed to determine whether a touch occurs, so as to achieve the touch function.

Figure 9:
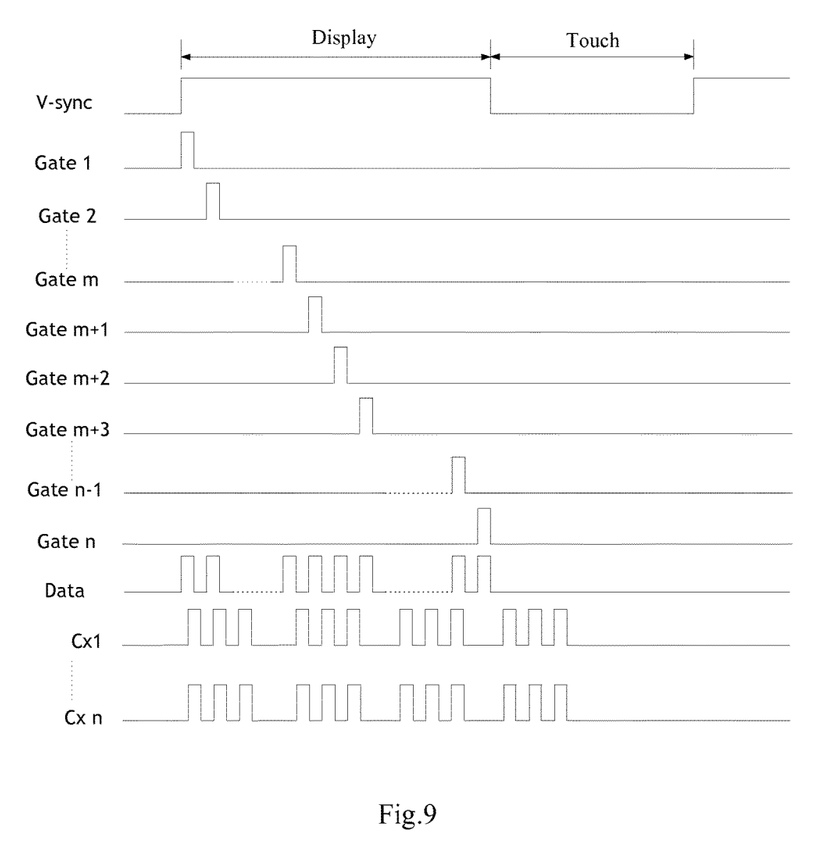
FIG. 9 is a schematic view illustrating a simultaneous drive time sequence for touch and display of an in-cell touch panel provided by an embodiment of present disclosure.

For example, when the simultaneous drive manner is employed, in the drive time sequence diagram illustrated in FIG. 9, during the time period for each frame (V-sync), each gate signal line Gate 1, Gate 2, . . . , Gate n in the touch panel is applied with a gate scanning signal sequentially, and a gray scale signal is applied to the data signal line, so as to achieve the liquid crystal display function; and simultaneously, the touch detection chip connected with the self-capacitance electrodes Cx 1, . . . , Cx n applies a driving signal simultaneously to each of the self-capacitance electrodes Cx 1, . . . , Cx n, and receives feedback signals from the self-capacitance electrodes Cx 1, . . . , Cx n, and then the feedback signals are analyzed to determine whether a touch occurs, so as to achieve the touch function.

Based on the identical inventive concept, at least one embodiment of the present disclosure also provides a display device comprising the above-mentioned in-cell touch panel provided by any one of the embodiments of present disclosure. Such a display device may be any product or part with display function, such as a cell phone, a tablet computer, a television, a display, a notebook computer, a digital photo frame and a navigator. The implementations for this display device may refer to the above embodiments for the in-cell touch panel, and repeated description will be omitted here.

In the above-mentioned in-cell touch panel and display device provided by embodiments of present disclosure, a plurality of self-capacitance electrodes arranged in a same layer and insulated from each other is provided in the touch panel by means of self-capacitance principle, a shielding electrode is provided at a side, facing the lower substrate, of each of the self-capacitance electrodes, and an insulating layer is provided between the self-capacitance electrodes and the shielding electrode; the touch detection signals applied to the self-capacitance electrodes are separated from the signals for display by the shielding electrode insulated from the self-capacitance electrodes, so as to avoid mutual interference therebetween, and this achieves synchronous execution of the touch detection drive and display drive and ensures a better display and touch effect.

It is apparent to those skilled in the art to make various modifications and variations to the present disclosure without departing from the spirit and scope of the present disclosure. In this way, if these modifications and variations belong to the scope of the claims of the present disclosure and their equivalents, then the present disclosure is intended to cover these modifications and variations.

The present application claims the priority of the Chinese patent application No. 201410241051.3, filed on May 30, 2014, the entirety of which is incorporated herein by reference as a part of the present application.

What is claimed is:

1. An in-cell touch panel, comprising:
   an upper substrate and a lower substrate arranged oppositely to each other;
   a plurality of self-capacitance electrodes arranged in a same layer and insulated from each other at a side, facing the lower substrate, of the upper substrate or a side, facing the upper substrate, of the lower substrate;
   a shielding electrode provided at a side, facing the lower substrate, of each of the self-capacitance electrodes, wherein each of the self-capacitance electrodes is insulated from the shielding electrode; and
   an insulating layer provided between each of the self-capacitance electrodes and the shielding electrode,
   wherein the in-cell touch panel further comprises a black matrix layer, and each of the self-capacitance electrodes is between the black matrix layer and the shielding electrode in an arrangement direction of the upper substrate and the lower substrate; in the arrangement direction of the upper substrate and the lower substrate, the black matrix layer is between each of the self-capacitance electrodes and the upper substrate and the shielding electrode is between the black matrix layer and the lower substrate;
   the in-cell touch panel further comprises at least one conductive wire being electrically connected with and corresponding, in a one-to-one manner, to each of the self-capacitance electrodes; and the conductive wire is arranged in a same layer as the shielding electrode, and each of the self-capacitance electrodes is electrically connected with the conductive wire that the self-capacitance electrode corresponds to, through a via hole within the insulating layer.

2. The in-cell touch panel according to claim 1, further comprising: a touch detection chip configured to determine a touch position by detecting variation of capacitance value of each of the self-capacitance electrodes.

3. The in-cell touch panel according to claim 1, further comprising: a black matrix layer provided at the side, facing the lower substrate, of the upper substrate or the side, facing the upper substrate, of the lower substrate;

wherein an orthographic projection, upon the lower substrate, of a pattern of each of the self-capacitance electrodes and an orthographic projection, upon the lower substrate, of a pattern of the shielding electrode are arranged within an area where a pattern of the black matrix layer is arranged.

4. The in-cell touch panel according to claim 3, wherein the orthographic projection, upon the lower substrate, of the pattern of each of the self-capacitance electrodes and the orthographic projection, upon the lower substrate, of the pattern of the shielding electrode are respectively of a lattice structure within the area where the pattern of the black matrix layer is arranged.

5. The in-cell touch panel according to claim 3, further comprising:

at least one conductive node corresponding to the self-capacitance electrode in a one-to-one manner; wherein
the conductive wire each has an orthographic projection, upon the lower substrate, arranged in the area where the pattern of the black matrix layer is arranged, and the conductive node each is provided within an area where a frame sealant of the in-cell touch panel is arranged; and
each of the self-capacitance electrodes is connected to the conductive node through the conductive wire, and then is electrically connected with a connection terminal of the touch detection chip through a leading wire arranged within the area where the frame sealant is arranged.

6. The in-cell touch panel according to claim 5, wherein the conductive wire and each of the self-capacitance electrode are provided in a same layer; and the orthographic projection, upon the lower substrate, of the pattern of the shielding electrode covers the pattern of the conductive wire and the pattern of each of the self-capacitance electrodes.

7. The in-cell touch panel according to claim 5, wherein the orthographic projection, upon the lower substrate, of the pattern of the shielding electrode and the orthographic projection, upon the lower substrate, of the pattern of the conductive wire cover the patterns of each of the self-capacitance electrodes.

8. The in-cell touch panel according to claim 7, wherein the black matrix layer is arranged at the side, facing the lower substrate, of the upper substrate, a color filter layer is provided on the black matrix layer, a planarization layer is provided on the color filter layer, and a spacer layer is provided on the planarization layer;

each of the self-capacitance electrodes is arranged between the black matrix layer and the color filter layer, the conductive wire and the shielding electrode are arranged between the color filter layer and the planarization layer, and the color filter layer acts as the insulating layer between the self-capacitance electrode and the shielding electrode; or
each of the self-capacitance electrodes is arranged between the color filter layer and the planarization layer, the conductive wire and the shielding electrode are arranged between the planarization layer and the spacer layer, and the planarization layer acts as the insulating layer between the self-capacitance electrode and the shielding electrode; or
each of the self-capacitance electrodes is arranged between the planarization layer and the spacer layer, the conductive wire and the shielding electrode are arranged on the spacer layer, and the spacer layer acts as the insulating layer between the self-capacitance electrode and the shielding electrode.

9. The in-cell touch panel according to claim 7, the lower substrate is provided with a common electrode layer thereon, a passivation layer is arranged on the common electrode layer, and a pixel electrode layer is provided on the passivation layer; and each of the self-capacitance electrodes is arranged on the passivation layer, the conductive wire and the shielding electrode are arranged between the common electrode layer and the passivation layer, and the passivation layer acts as the insulating layer between the self-capacitance electrode and the shielding electrode.

10. The in-cell touch panel according to claim 2, wherein the touch detection chip is configured to operate during both a display time period and a touch time period of each frame, or operate only during the touch time period of each frame.

11. A display device comprising the in-cell touch panel according to claim 1.

12. The in-cell touch panel according to claim 4, further comprising: at least one conductive wire being electrically connected with and corresponding, in a one-to-one manner, to each of the self-capacitance electrodes, and at least one conductive node corresponding to the self-capacitance electrode in a one-to-one manner; wherein the conductive wire each has an orthographic projection, upon the lower substrate, arranged in the area where the pattern of the black matrix layer is arranged, and the conductive node each is provided within an area where a frame sealant of the in-cell touch panel is arranged; and
each of the self-capacitance electrodes is connected to the conductive node through the conductive wire, and then is electrically connected with a connection terminal of the touch detection chip through a leading wire arranged within the area where the frame sealant is arranged.

13. The in-cell touch panel according to claim 12, wherein the conductive wire and each of the self-capacitance electrode are provided in a same layer; and the orthographic projection, upon the lower substrate, of the pattern of the shielding electrode covers the pattern of the conductive wire and the pattern of each of the self-capacitance electrodes.

14. The in-cell touch panel according to claim 12, wherein the conductive wire is arranged in a same layer as the shielding electrode, and each of the self-capacitance electrodes is electrically connected with the conductive wire that the self-capacitance electrode corresponds to, through a via hole within the insulating layer; and the orthographic projection, upon the lower substrate, of the pattern of the shielding electrode and the orthographic projection, upon the lower substrate, of the pattern of the conductive wire cover the patterns of each of the self-capacitance electrodes.

15. The in-cell touch panel according to claim 3, wherein the black matrix layer is arranged at the side, facing the lower substrate, of the upper substrate, a color filter layer is provided on the black matrix layer, a planarization layer is provided on the color filter layer, and a spacer layer is provided on the planarization layer; and     each of the self-capacitance electrodes is arranged between the black matrix layer and the color filter layer, the conductive wire and the shielding electrode are arranged between the color filter layer and the planarization layer, and the color filter layer acts as the insulating layer between the self-capacitance electrode and the shielding electrode; or     each of the self-capacitance electrodes is arranged between the color filter layer and the planarization layer, the conductive wire and the shielding electrode are arranged between the planarization layer and the spacer layer, and the planarization layer acts as the insulating layer between the self-capacitance electrode and the shielding electrode; or     each of the self-capacitance electrodes is arranged between the planarization layer and the spacer layer, the conductive wire and the shielding electrode are arranged on the spacer layer, and the spacer layer acts as the insulating layer between the self-capacitance electrode and the shielding electrode.

16. The in-cell touch panel according to claim 4, wherein the black matrix layer is arranged at the side, facing the lower substrate, of the upper substrate, a color filter layer is provided on the black matrix layer, a planarization layer is provided on the color filter layer, and a spacer layer is provided on the planarization layer; and     each of the self-capacitance electrodes is arranged between the black matrix layer and the color filter layer, the conductive wire and the shielding electrode are arranged between the color filter layer and the planarization layer, and the color filter layer acts as the insulating layer between the self-capacitance electrode and the shielding electrode; or     each of the self-capacitance electrodes is arranged between the color filter layer and the planarization layer, the conductive wire and the shielding electrode are arranged between the planarization layer and the spacer layer, and the planarization layer acts as the insulating layer between the self-capacitance electrode and the shielding electrode; or     each of the self-capacitance electrodes is arranged between the planarization layer and the spacer layer, the conductive wire and the shielding electrode are arranged on the spacer layer, and the spacer layer acts as the insulating layer between the self-capacitance electrode and the shielding electrode.

17. The in-cell touch panel according to claim 8, wherein the touch detection chip is configured to operate during both a display time period and a touch time period of each frame, or operate only during the touch time period of each frame.

18. The in-cell touch panel according to claim 9, wherein the touch detection chip is configured to operate during both a display time period and a touch time period of each frame, or operate only during the touch time period of each frame.

19. An in-cell touch panel, comprising:

an upper substrate and a lower substrate arranged oppositely to each other;

a plurality of self-capacitance electrodes arranged in a same layer and insulated from each other at a side, facing the lower substrate, of the upper substrate or a side, facing the upper substrate, of the lower substrate;

a shielding electrode provided at a side, facing the lower substrate, of each of the self-capacitance electrodes, wherein each of the self-capacitance electrodes is insulated from the shielding electrode; and an insulating layer provided between each of the self-capacitance electrodes and the shielding electrode, wherein the in-cell touch panel further comprises at least one conductive wire being electrically connected with and corresponding, in a one-to-one manner, to each of the self-capacitance electrodes; and the conductive wire is arranged in a same layer as the shielding electrode, and each of the self-capacitance electrodes is electrically connected with the conductive wire that the self-capacitance electrode corresponds to, through a via hole within the insulating layer.

20. An in-cell touch panel, comprising:

an upper substrate and a lower substrate arranged oppositely to each other;

a plurality of self-capacitance electrodes arranged in a same layer and insulated from each other at a side, facing the lower substrate, of the upper substrate or a side, facing the upper substrate, of the lower substrate;

a shielding electrode provided at a side, facing the lower substrate, of each of the self-capacitance electrodes, wherein each of the self-capacitance electrodes is insulated from the shielding electrode; and an insulating layer provided between each of the self-capacitance electrodes and the shielding electrode, wherein the in-cell touch panel further comprises a planarization layer on the upper substrate and a spacer layer on the planarization layer, each of the self-capacitance electrodes is arranged between the planarization layer and the spacer layer, the conductive wire and the shielding electrode are arranged on the spacer layer, and the spacer layer acts as the insulating layer between the self-capacitance electrode and the shielding electrode.

\* \* \* \* \*